US012685686B2

(12) United States Patent
Thompson et al.

(10) Patent No.: US 12,685,686 B2
(45) Date of Patent: Jul. 21, 2026

(54) MEDICAL TABLE ASSEMBLY

(71) Applicants: Patricia Thompson, Houston, TX (US); Sean Copeland, Houston, TX (US)

(72) Inventors: Patricia Thompson, Houston, TX (US); Sean Copeland, Houston, TX (US)

( * ) Notice: Subject to any disclaimer, the term of this patent is extended or adjusted under 35 U.S.C. 154(b) by 430 days.

(21) Appl. No.: 18/220,019

(22) Filed: Jul. 10, 2023

(65) Prior Publication Data

US 2025/0017804 A1 Jan. 16, 2025

(51) Int. Cl.
*A61H 1/02* (2006.01)

(52) U.S. Cl.
CPC ... *A61H 1/0222* (2013.01); *A61H 2201/0157* (2013.01); *A61H 2201/0173* (2013.01); *A61H 2201/1215* (2013.01); *A61H 2201/164* (2013.01); *A61H 2201/1654* (2013.01); *A61H 2201/1669* (2013.01); *A61H 2201/5046* (2013.01); *A61H 2203/0456* (2013.01)

(58) Field of Classification Search
CPC .......... A61H 1/0222; A61H 2201/0157; A61H 2201/0173; A61H 2201/1215; A61H 2201/164; A61H 2201/1654; A61H 2201/1669; A61H 2201/5046; A61H 2203/0456; A61H 1/0259; A61G 13/009; A61G 7/015; A61G 7/002; A61G 13/08; A61G 1/00; A61G 7/0507; A61G 7/0525
USPC ....... 482/123, 132, 142; 602/33; 5/627, 425, 5/613
See application file for complete search history.

(56) References Cited

U.S. PATENT DOCUMENTS 5,688,228 A 11/1997 Lin
5,898,964 A * 5/1999 Stanley .................. A47C 21/08 5/663
6,851,144 B2 2/2005 Wang
D710,507 S 8/2014 Leng
9,820,583 B1 11/2017 Gu
10,893,997 B2 1/2021 Koenig
2005/0172398 A1 8/2005 Smith
2007/0245488 A1* 10/2007 Zimbalista .......... B60B 33/0073 5/86.1
2011/0208242 A1* 8/2011 Hoffman .............. A61H 1/0222 606/241
2013/0340167 A1* 12/2013 Karwal .............. A61G 13/0009 5/81.1 R
2015/0186611 A1 7/2015 George
(Continued)

FOREIGN PATENT DOCUMENTS

WO WO2017063639 4/2017

*Primary Examiner* — Justin C Mikowski
*Assistant Examiner* — Deborah Talitha Gedeon

(57) ABSTRACT

A medical table assembly includes a medical table that has a pad and a frame. The pad has a fixed portion and a pair of movable portions that is each urgeable back and forth with respect to the fixed portion for linearly stretching the patient's body. A pair of motion units is each in mechanical communication with a respective one of the pair of movable portions of the pad for urging the respective movable portion to move back and forth with respect to the fixed portion. A touch screen is pivotally attached to the frame and the touch screen is positionable in a deployed position and a stored position. The touch screen is in communication with the motion unit for turning the motion unit on and off.

6 Claims, 4 Drawing Sheets

(56) References Cited

U.S. PATENT DOCUMENTS

| | | | | |
|---|---|---|---|---|
| 2019/0053751 | A1 | 2/2019 | Torres | |
| 2021/0106479 | A1 * | 4/2021 | Zerhusen | A63B 21/00178 |
| 2023/0124446 | A1 * | 4/2023 | Brian | A61H 1/008<br>601/87 |

* cited by examiner

MEDICAL TABLE ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to medical treatment table devices and more particularly pertains to a medical table device for linearly stretching a patient. The device includes a medical table that has a pad with a fixed portion and a pair of movable portions. The device includes a pair of motion units that are each integrated into the medical table for moving the movable portions of the pad back and forth for stretching the user. The device includes a touch screen that is pivotally attached to the medical table for controlling the motion units.

(2) Description of Related Art Including Information Disclosed Under 37 CFR 1.97 and 1.98

The prior art relates to bed devices including a variety of medical tables which each includes massaging elements or motorized panels for elevating a patient's body or limb mechanisms for rehabilitating a patient's limbs. In no instance does the prior art discloses a medical table which includes a pad that has movable portions and a pair of motion units for urging the movable portions back and forth.

(h) BRIEF SUMMARY OF THE INVENTION

An embodiment of the disclosure meets the needs presented above by generally comprising a medical table that has a pad and a frame. The pad has a fixed portion and a pair of movable portions that are each urgeable back and forth with respect to the fixed portion for gently stretching the patient's back. Each of a pair of motion units is in mechanical communication with a respective one of the pair of movable portions of the pad for urging the respective movable portion to move back and forth with respect to the fixed portion. A touch screen is pivotally attached to the frame and the touch screen is positionable in a deployed position and a stored position. The touch screen is in communication with the motion unit for turning the motion unit on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
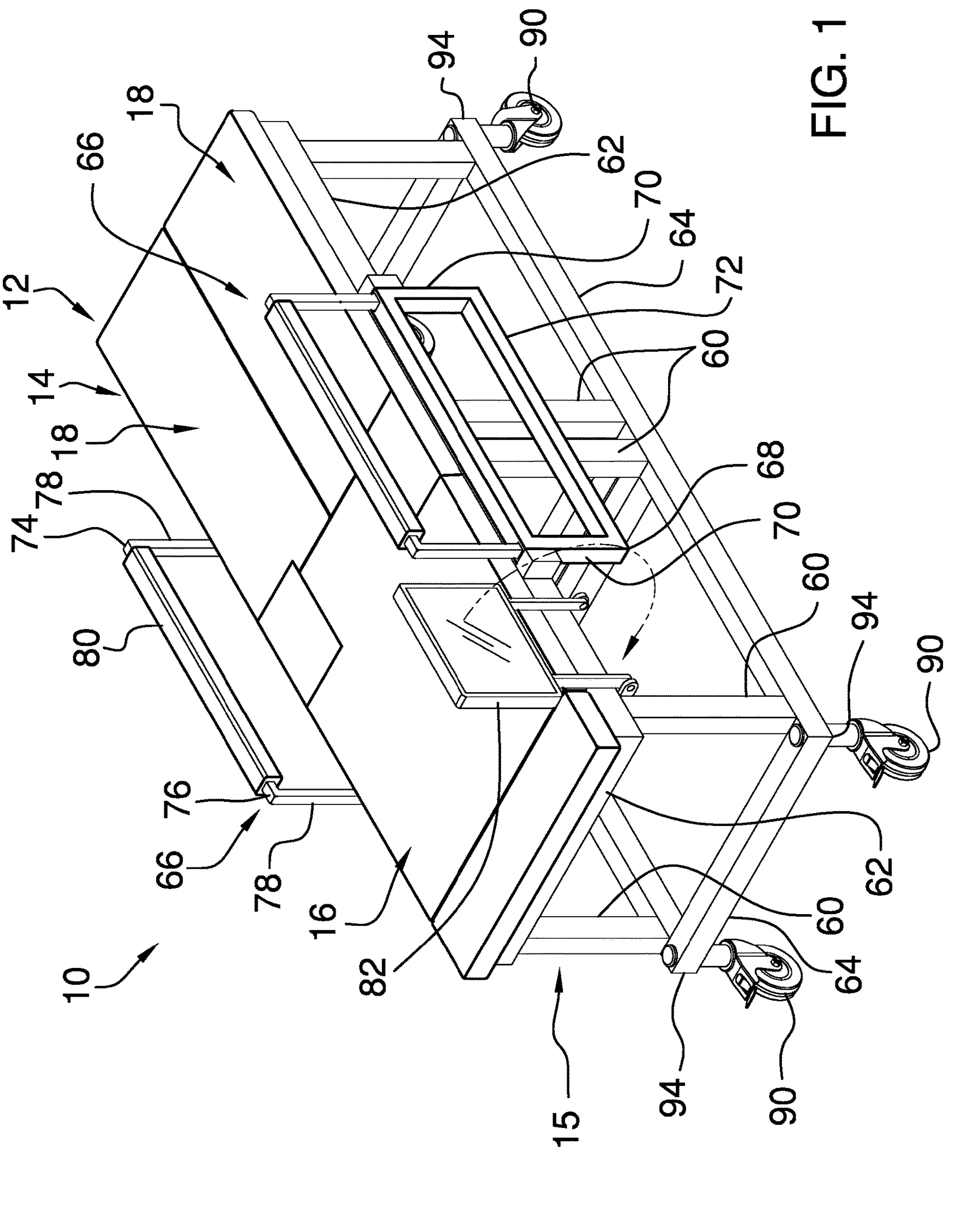
FIG. 1 is a top perspective view of a medical table assembly according to an embodiment of the disclosure.
Figure 2A:
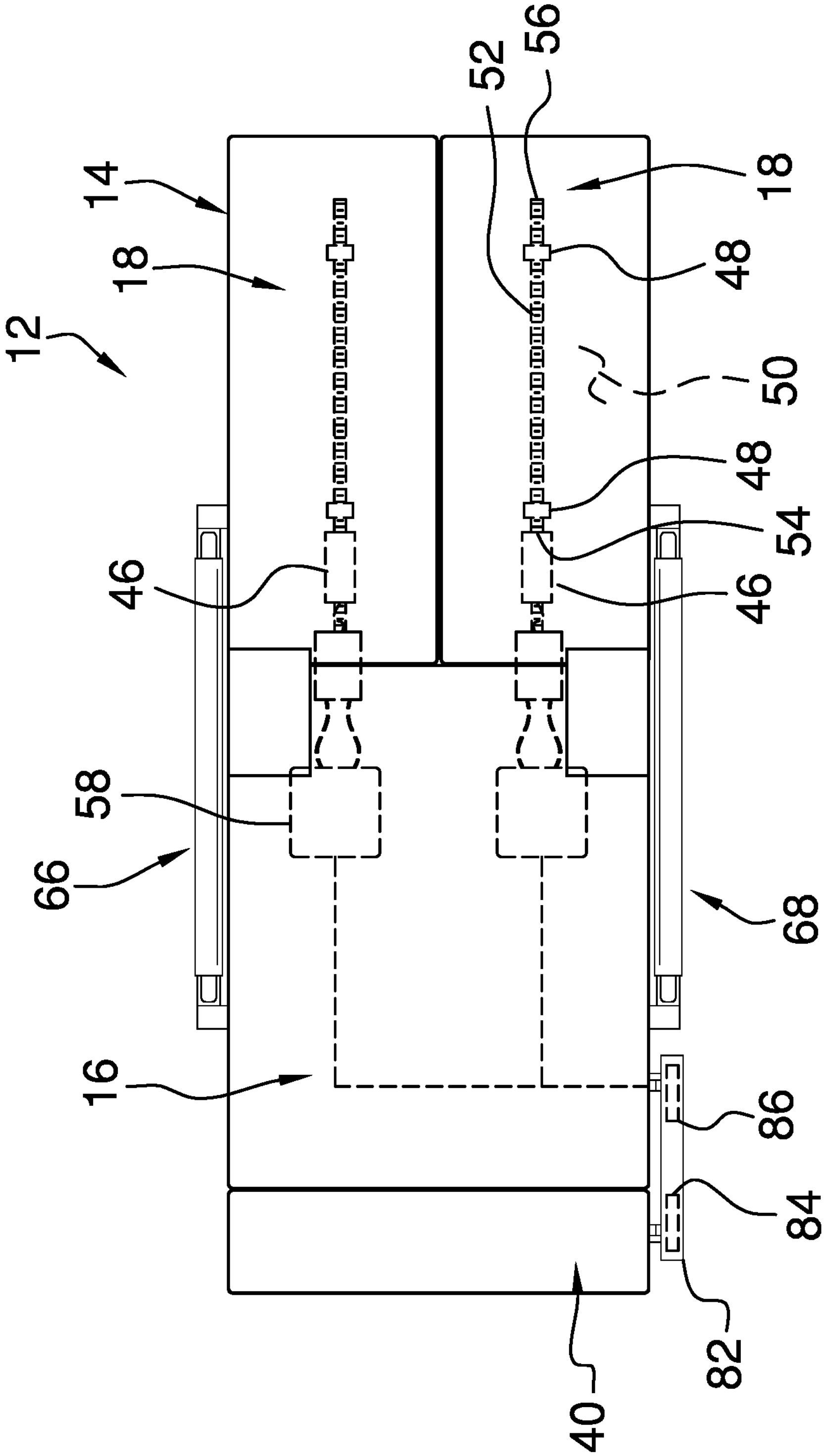
FIG. 2A is a top phantom view of an embodiment of the disclosure showing a pair of movable portions of a pad in a home position.
Figure 2B:
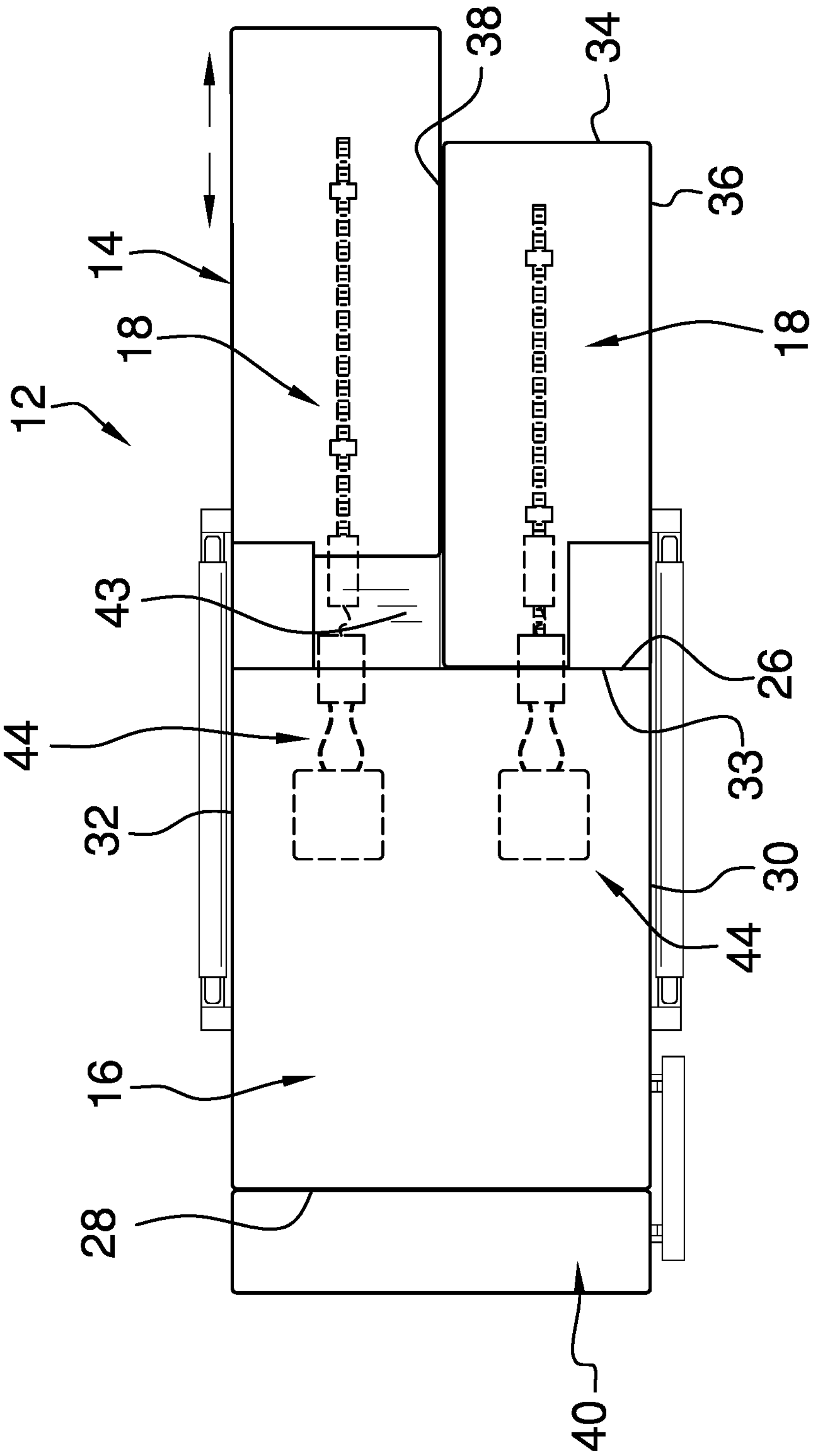
FIG. 2B is a top phantom view of an embodiment of the disclosure showing a movable portion of a pad in an extended position.
Figure 3:
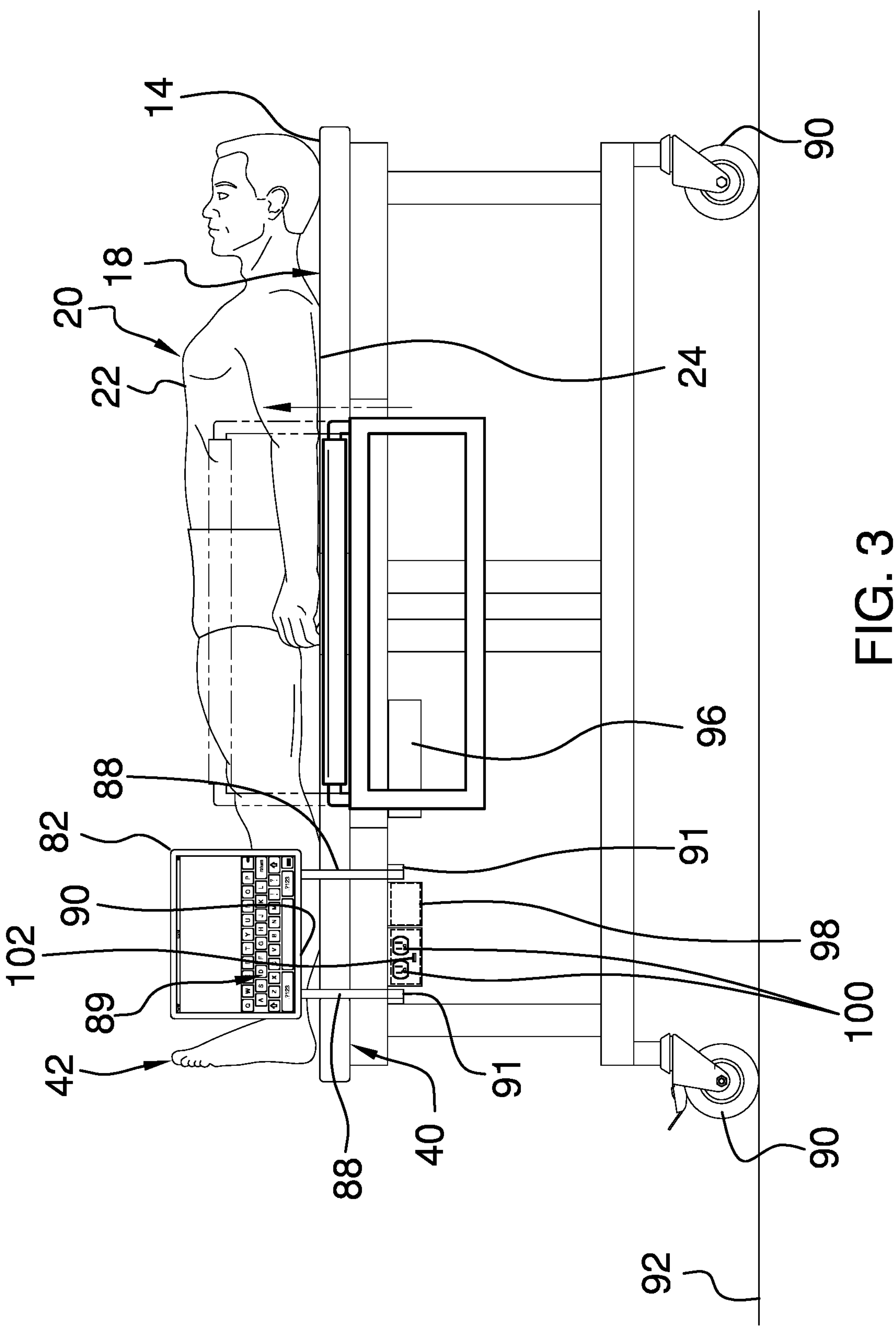
FIG. 3 is a perspective in-use view of an embodiment of the disclosure.

With reference now to the drawings, and in particular to FIGS. 1 through 3 thereof, a new medical table device embodying the principles and concepts of an embodiment of the disclosure and generally designated by the reference numeral 10 will be described.

As best illustrated in FIGS. 1 through 3, the medical table assembly 10 generally comprises a medical table 12 having a pad 14 and a frame 15. The pad 14 has a fixed portion 16 and a pair of movable portions 18. The pad 14 can be 2-3 inches thick sponge or foam material covered by vinyl or the like. A patient 20 lies on the pad 14 having the patient's torso 22 resting on the pair of movable portions 18. Additionally, each of the movable portions 18 is urgeable back and forth with respect to the fixed portion 16. In this way the pair of movable portions 18 can provide linear stretching motion to the patient's back 24. The medical table 12 may be located in a hospital, a nursing home, spa, rehab center, or other location where patients are commonly cared for or receive treatment.

The fixed portion 16 has a front edge 26, a back edge 28, a first lateral edge 30 and a second lateral edge 32. Each of the pair of movable portions 18 has a rear edge 33, a forward edge 34, a first sidelong edge 36 and a second sidelong edge 38. Each of the pair of movable portions 18 is elongated between the rear edge 33 and the forward edge 34 and each of the movable portions 18 is slidable between a home position and an extended position. The rear edge 33 of a respective one of the pair of movable portions 18 abuts the front edge 26 of the fixed portion 16 when the respective movable portion 18 is in the home position. Conversely, the rear edge 33 of a respective one of the movable portions 18 is spaced from the front edge 26 of the fixed portion 16 when the respective movable portion 18 is in the extended position. The pad 14 has a footrest portion 40 extending along the back edge 28 of the fixed portion 16 to support the patient's feet 42. As is most clearly shown in FIG. 2B, a shroud 43 extends between the rear edge 33 of each of the movable portions 18 and the front edge 26 of the front portion 16.

A pair of motion units 44 is each attached to the fixed portion 16 of the pad 14 and each of the pair of the motion units 44 is in mechanical communication with a respective one of the pair of movable portions 18 of the pad 14. Each of the pair of motion units 44 urges the respective movable portion 18 to move back and forth with respect to the fixed portion 16. Each of the motion units 44 comprises a motor 46 that is attached to the frame 15 such that the motor 46 is positioned beneath a respective one of the movable portions 18. The motor 46 alternatively rotates in a first direction and a second direction when the motor 46 is turned on. Additionally, the motor 46 may comprise a two direction electric motor or the like.

Each of the motion units 44 includes a pair of collars 48 that is each attached to a bottom surface 50 of the respective movable portion 18. The collars 48 are spaced apart from each other and are distributed between the rear edge 33 and the forward edge 34 of the respective movable portion 18. Each of the motion units 44 includes a screw 52 that has a first end 54 which is attached to an output of the motor 46 such that the screw 52 rotates when the motor 46 is turned on. The screw 52 extends through each of the pair of collars 48 such that each of the pair of collars 48 threadably engages the screw 52. The collars 48 travel toward a second end 56 of the screw 52 when the motor 46 rotates in the first direction thereby urging the respective movable portion 18 away from the fixed portion 16. Conversely, the collars 48 travel toward the first end 54 of the screw 52 when the motor 46 rotates in the second direction thereby urging the respective movable portion 18 toward the fixed portion 16. Each of the motion units 44 includes a power supply 58 that is attached to the frame 15. The power supply 58 is electrically coupled to the motor 46 and the power supply 58 comprises at least one battery.

The frame 15 has a plurality of vertical members 60 each extending between a set of top horizontal members 62 and a set of bottom horizontal members 64. The pad 14 is positioned on the set of top horizontal members 62. A pair of guard rails 66 is each movably integrated into the frame 15. Each of the pair of guard rails 66 is positionable in a deployed position having the pair of guard rails 66 extending upwardly from the frame 15. In this way the pair of guard rails 66 inhibits the patient 20 from rolling off of the pad 14. Each of the pair of guard rails 66 is positionable in a stored position having the pair of guard rails 66 being recessed in the frame 15. In this way the pair of guard rails 66 facilitates the patient 20 to roll off of the pad 14.

Each of the pair of guard rails 66 comprises a receiver frame 68 which has a pair of first members 70 each extending between and being perpendicularly oriented with a pair of second members 72 such that the receiver frame 68 has a rectangular shape. A respective one of the pair of second members 72 is attached to a respective one of the set of top horizontal members 62 of the frame 15 having the respective second member 72 being oriented parallel to the respective top horizontal member 62. Each of the pair of guard rails 66 includes a bracket 74 that has a central member 76 extending between and being perpendicularly oriented with a pair of outward members 78. Each of the outward members 78 extends into a respective one of the pair of first members 70 of the receiver frame 68 such that the central member 76 is horizontally oriented. The central member 76 rests on the second member 72 of the receiver frame 68 that is attached to the respective top horizontal member 62 when the bracket 74 is positioned in a stored position. Conversely, the central member 76 is spaced from the second member 72 of the receiver frame 68 that is attached to the respective top horizontal member 62 when the bracket 74 is positioned in a deployed position.

Each of the guard rails 66 includes a cushion 80 that is positioned around the central member 76 of the bracket 74. The cushion 80 extends substantially between the pair of outward members 78. Additionally, the cushion 80 is comprised of a resiliently compressible material to enhance comfort for the patient 20. A touch screen 82 is pivotally attached to the frame 15 and the touch screen 82 is positionable in a deployed position such that the touch screen 82 can be manipulated by a caregiver. The touch screen 82 is in communication with the motion units 44 for turning the motion units 44 on and off. Additionally, the touch screen 82 is positionable in a stored position having the touch screen 82 being concealed. The touch screen 82 may comprise a liquid crystal display or other type of electronic touch screen commonly employed in electronic control systems. The touch screen 82 includes a control circuit 84 and an electronic memory 86 which stores various operational subroutines for the motion units 44 to facilitate the motion units 44 to be programmed for repetitions, extension of movement, and other operational aspects of the motion units 44. In this way the velocity and the duration of time each movable portion remains in the home position can be adjusted.

The touch screen 82 includes a pair of pivots 88 each extending away from a lower edge 90 of the touch screen 82. A distal end 91 of each of the pivots 88 is pivotally coupled to the top horizontal member 62 of the frame 15 to which the respective second member 72 of the receiver frame 68 is attached. Each of the pivots 88 extends upwardly from the top horizontal member 62 of the frame 15 when the touch screen 82 is in the deployed position having the touch screen 82 being elevated above the pad 14. Each of the pivots 88 extends downwardly from the top horizontal member 62 of the frame 15 when the touch screen 82 is in the stored position having the touch screen 82 being positioned below the pad 14. As is most clearly shown in FIG. 3, a keyboard 89 may be movably integrated into the touch screen 82 for entering data into the touch screen or the keyboard 89 may be indicia displayed on the touch screen 82.

A plurality of rollers 90 is each rotatably coupled to the frame 15 to roll along a support surface 92. Each of the plurality of rollers 90 extends downwardly from the set of bottom horizontal members 64 of the frame 15. Each of the plurality of rollers 90 is aligned with a respective one of four corners 94 defined by the set of bottom horizontal members 64. Each of the plurality of rollers 90 may comprise a locking caster or other similar type of roller. A battery 96 is attached to the frame 15 and a power inverter 98 is attached to the frame 15. The battery 96 is electrically coupled to the power inverter 98 and the power inverter 98 has a pair of female electrical outlets 100 as well and a charging port 102. The power inverter 98 converts the direct current voltage of the battery 96 into alternating current that is supplied to the female electrical outlets 100. In this way the female electrical outlets 100 can supply operational power to the motion units 44 in the event that electrical power is not available. Power can also alternatively be provided by electrical connection of solar panels through the inverter 98 and a battery. The battery can also be provided to maintain operation in the event of a power failure.

In use, the patient 20 is laid on the pad 14 and the caregiver manipulates the touch screen 82 to program operational parameters of the motion units 44. The motion units 44 urge each of the movable portions 18 of the pad 14 back and forth at a speed and duration according to the operational parameters programmed with the touch screen 82. In this way the movable portions 18 provide linear stretching of the patient's back 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items 10 following the word are included, but items not specifically mentioned are not excluded. A reference to an element by the indefinite article "a" does not exclude the possibility that more than one of the element is present, unless the context clearly requires that there be only one of the elements.

The invention claimed is:

1. A medical table assembly having moving sections for linear stretching, said assembly comprising:

- a medical table having a pad and a frame, said pad having a fixed portion and a pair of movable portions wherein said pad is configured to have a patient lie on said pad having the patient's torso resting on said pair of movable portions, each of said movable portions being urgeable back and forth with respect to said fixed portion wherein said pair of movable portions is configured to linearly stretch the patient's back;
- a pair of motion units, each of said pair of motion units being attached to said fixed portion of said pad, each of said pair of said motion units being in mechanical communication with a respective one of said pair of movable portions of said pad, each of said pair of motion units urging said respective movable portion to move back and forth with respect to said fixed portion;
- a pair of guard rails, each of said pair of guard rails being movably integrated into said frame, each of said pair of guard rails being positionable in a deployed position having said pair of guard rails extending upwardly from said frame wherein said pair of guard rails is configured to inhibit the patient from rolling off of said pad, each of said pair of guard rails being positionable in a stored position having said pair of guard rails being recessed in said frame wherein said pair of guard rails is configured to facilitate the patient to roll off of said pad;
- a touch screen being pivotally attached to said frame, said touch screen being positionable in a deployed position wherein said touch screen is configured to be manipulated by a caregiver, said touch screen being in communication with said motion unit for turning said motion unit on and off, said touch screen being positionable in a stored position having said touch screen being concealed;

wherein each of said motion units comprises

- a motor being attached to said frame such that said motor is positioned beneath a respective one of said movable portions, said motor alternatively rotating in a first direction and a second direction when said motor is turned on;
- a pair of collars, each of said pair of collars being attached to a bottom surface of said respective movable portion, said pair of collars being spaced apart from each other and being distributed between said rear edge and said forward edge of said respective movable portion;
- a screw having a first end being attached to an output of said motor such that said screw rotates when said motor is turned on, said screw extending through each of said pair of collars such that each of said pair of collars threadably engages said screw, said pair of collars travelling toward a second end of said screw when said motor rotates in said first direction thereby urging said respective movable portion away from said fixed portion, said pair of collars travelling toward said first end of said screw when said motor rotates in said second direction thereby urging said respective movable portion toward said fixed portion; and
- a power supply being attached to said frame, said power supply being electrically coupled to said motor, said power supply comprising at least one battery;

wherein said frame has a plurality of vertical members each extending between a set of top horizontal members and a set of bottom horizontal members, said pad being positioned on said set of top horizontal members;

wherein each of said pair of guard rails comprises a receiver frame having a pair of first members each extending between and being perpendicularly oriented with a pair of second members such that said receiver frame has a rectangular shape, a respective one of said pair of second members being attached to a respective one of said set of top horizontal members of said frame having said respective second member being oriented parallel to said respective top horizontal member;

wherein each of said guard rails includes a bracket having a central member extending between and being perpendicularly oriented with a pair of outward members, each of said outward members extending into a respective one of said pair of first members of said receiver frame such that said central member is horizontally oriented, said central member resting on said second member of said receiver frame that is attached to said respective top horizontal member when said bracket is positioned in a stored position, said central member being spaced from said second member of said receiver frame that is attached to said respective top horizontal member when said bracket is positioned in a deployed position; and wherein each of said guard rails includes a cushion being positioned around said central member of said bracket, said cushion extending substantially between said pair of outward members, said cushion being comprised of a resiliently compressible material wherein said cushion is configured to enhance comfort for the patient.

2. The assembly according to claim 1, wherein:

said fixed portion has a front edge, a back edge, a first lateral edge and a second lateral edge, each of said pair of movable portions having a rear edge, a forward edge, a first sidelong edge and a second sidelong edge, each of said pair of movable portions being elongated between said rear edge and said forward edge;

each of said movable portions is slidable between a home position and an extended position;

said rear edge of said a respective one of said pair of movable portions abuts said front edge of said fixed portion when said respective movable portion is in said home position; and said rear edge of a respective one of said movable portions is spaced from said front edge of said fixed portion when said respective movable portion is in said extended position.

3. The assembly according to claim 1, wherein said pad has a footrest portion extending along a back edge of said fixed portion wherein said footrest portion is configured to have the patient's feet lying on said footrest portion.

4. The assembly according to claim 1, wherein said touch screen includes a pair of pivots each extending away from a lower edge of said touch screen, a distal end of each of said pivots being pivotally coupled to said top horizontal member of said frame to which said respective second member of said receiver frame is attached, each of said pivots extending upwardly from said top horizontal member of said frame when said touch screen is in said deployed position having said touch screen being elevated above said pad, each of said pivots extending downwardly from said top horizontal member of said frame when said touch screen is in said stored position having said touch screen being positioned below said pad.

5. The assembly according to claim 1, wherein:

said frame has a plurality of vertical members each extending between a set of top horizontal members and a set of bottom horizontal members, said pad being positioned on said set of top horizontal members; and said assembly includes a plurality of rollers, each of said plurality of rollers being rotatably coupled to said frame wherein each of said plurality of rollers is configured to roll along a support surface, each of said plurality of rollers extending downwardly from said set of bottom horizontal members of said frame, each of said plurality of rollers being aligned with a respective one of four corners defined by said set of bottom horizontal members.

6. A medical table assembly having moving sections for linear stretching, said assembly comprising:

a medical table having a pad and a frame, said pad having a fixed portion and a pair of movable portions wherein said pad is configured to have a patient lie on said pad having the patient's torso resting on said pair of movable portions, each of said movable portions being urgeable back and forth with respect to said fixed portion wherein said pair of movable portions is configured to linearly stretch the patient's back, said fixed portion having a front edge, a back edge, a first lateral edge and a second lateral edge, each of said pair of movable portions having a rear edge, a forward edge, a first sidelong edge and a second sidelong edge, each of said pair of movable portions being elongated between said rear edge and said forward edge, each of said movable portions being slidable between a home position and an extended position, said rear edge of said a respective one of said pair of movable portions abutting said front edge of said fixed portion when said respective movable portion is in said home position, said rear edge of a respective one of said movable portions being spaced from said front edge of said fixed portion when said respective movable portion is in said extended position, said pad having a footrest portion extending along said back edge of said fixed portion wherein said footrest portion is configured to have the patient's feet lying on said footrest portion, said frame having a plurality of vertical members each extending between a set of top horizontal members and a set of bottom horizontal members, said pad being positioned on said set of top horizontal members;

a pair of motion units, each of said pair of motion units being attached to said fixed portion of said pad, each of said pair of said motion units being in mechanical communication with a respective one of said pair of movable portions of said pad, each of said pair of motion units urging said respective movable portion to move back and forth with respect to said fixed portion, each of said motion units comprising:

a motor being attached to said frame such that said motor is positioned beneath a respective one of said movable portions, said motor alternatively rotating in a first direction and a second direction when said motor is turned on;

a pair of collars, each of said pair of collars being attached to a bottom surface of said respective movable portion, said pair of collars being spaced apart from each other and being distributed between said rear edge and said forward edge of said respective movable portion;

a screw having a first end being attached to an output of said motor such that said screw rotates when said motor is turned on, said screw extending through each of said pair of collars such that each of said pair of collars threadably engages said screw, said pair of collars travelling toward a second end of said screw when said motor rotates in said first direction thereby urging said respective movable portion away from said fixed portion, said pair of collars travelling toward said first end of said screw when said motor rotates in said second direction thereby urging said respective movable portion toward said fixed portion; and a power supply being attached to said frame, said power supply being electrically coupled to said motor, said power supply comprising at least one battery;

a pair of guard rails, each of said pair of guard rails being movably integrated into said frame, each of said pair of guard rails being positionable in a deployed position having said pair of guard rails extending upwardly from said frame wherein said pair of guard rails is configured to inhibit the patient from rolling off of said pad, each of said pair of guard rails being positionable in a stored position having said pair of guard rails being recessed in said frame wherein said pair of guard rails is configured to facilitate the patient to roll off of said pad, each of said pair of guard rails comprising:

a receiver frame having a pair of first members each extending between and being perpendicularly oriented with a pair of second members such that said receiver frame has a rectangular shape, a respective one of said pair of second members being attached to a respective one of said set of top horizontal members of said frame having said respective second member being oriented parallel to said respective top horizontal member;

a bracket having a central member extending between and being perpendicularly oriented with a pair of outward members, each of said outward members extending into a respective one of said pair of first members of said receiver frame such that said central member is horizontally oriented, said central member resting on said second member of said receiver frame that is attached to said respective top horizontal member when said bracket is positioned in a stored position, said central member being spaced from said second member of said receiver frame that is attached to said respective top horizontal member when said bracket is positioned in a deployed position; and a cushion being positioned around said central member of said bracket, said cushion extending substantially between said pair of outward members, said cushion being comprised of a resiliently compressible material wherein said cushion is configured to enhance comfort for the patient;

a touch screen being pivotally attached to said frame, said touch screen being positionable in a deployed position wherein said touch screen is configured to be manipulated by a caregiver, said touch screen being in communication with said motion unit for turning said motion unit on and off, said touch screen being positionable in a stored position having said touch screen being concealed, said touch screen including a pair of pivots each extending away from a lower edge of said touch screen, a distal end of each of said pivots being pivotally coupled to said top horizontal member of said frame to which said respective second member of said receiver frame is attached, each of said pivots extending upwardly from said top horizontal member of said frame when said touch screen is in said deployed position having said touch screen being elevated above said pad, each of said pivots extending downwardly from said top horizontal member of said frame when said touch screen is in said stored position having said touch screen being positioned below said pad; and a plurality of rollers, each of said plurality of rollers being rotatably coupled to said frame wherein each of said plurality of rollers is configured to roll along a support surface, each of said plurality of rollers extending downwardly from said set of bottom horizontal members of said frame, each of said plurality of rollers being aligned with a respective one of four corners defined by said set of bottom horizontal members.

* * * * *